UNITED STATES PATENT OFFICE.

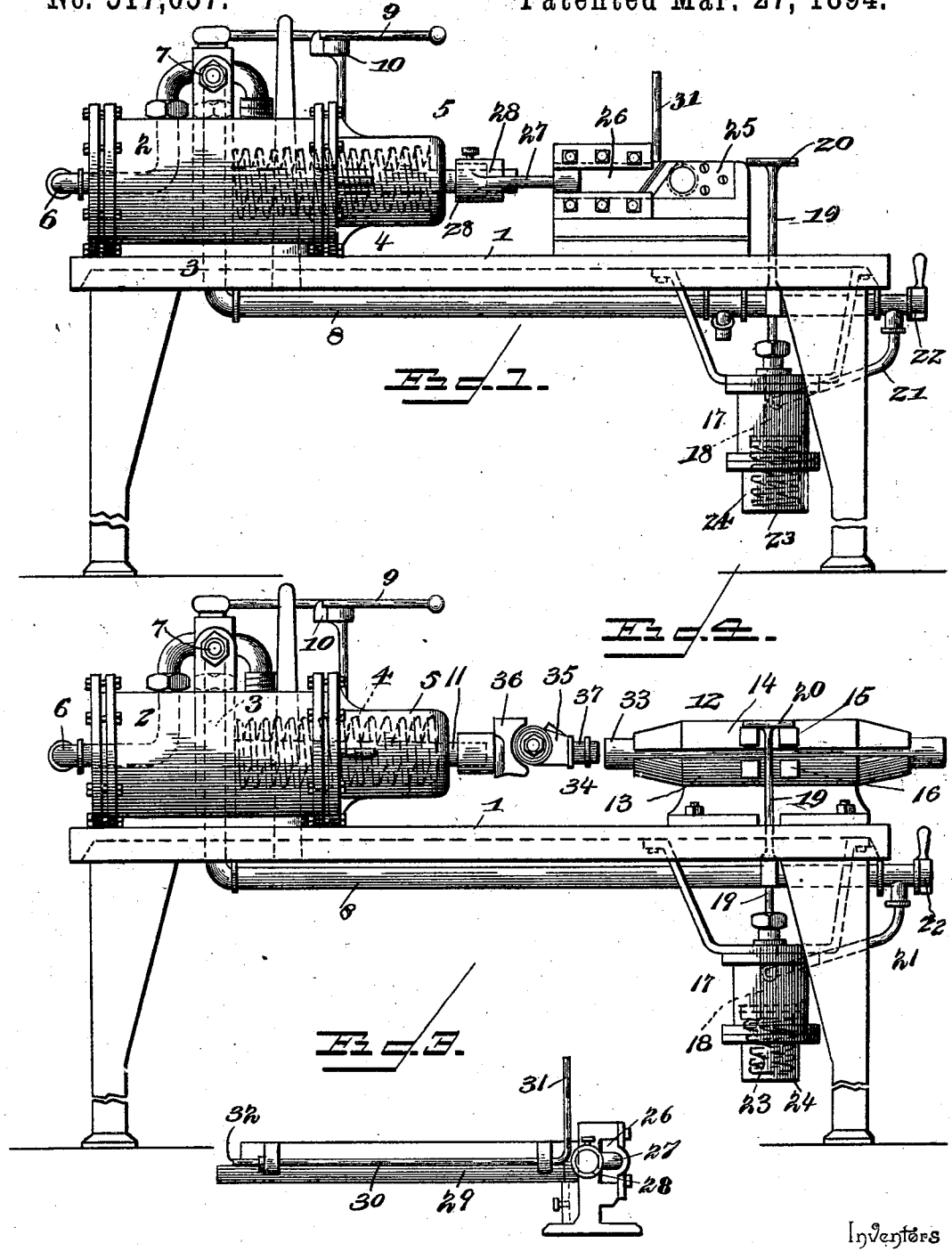

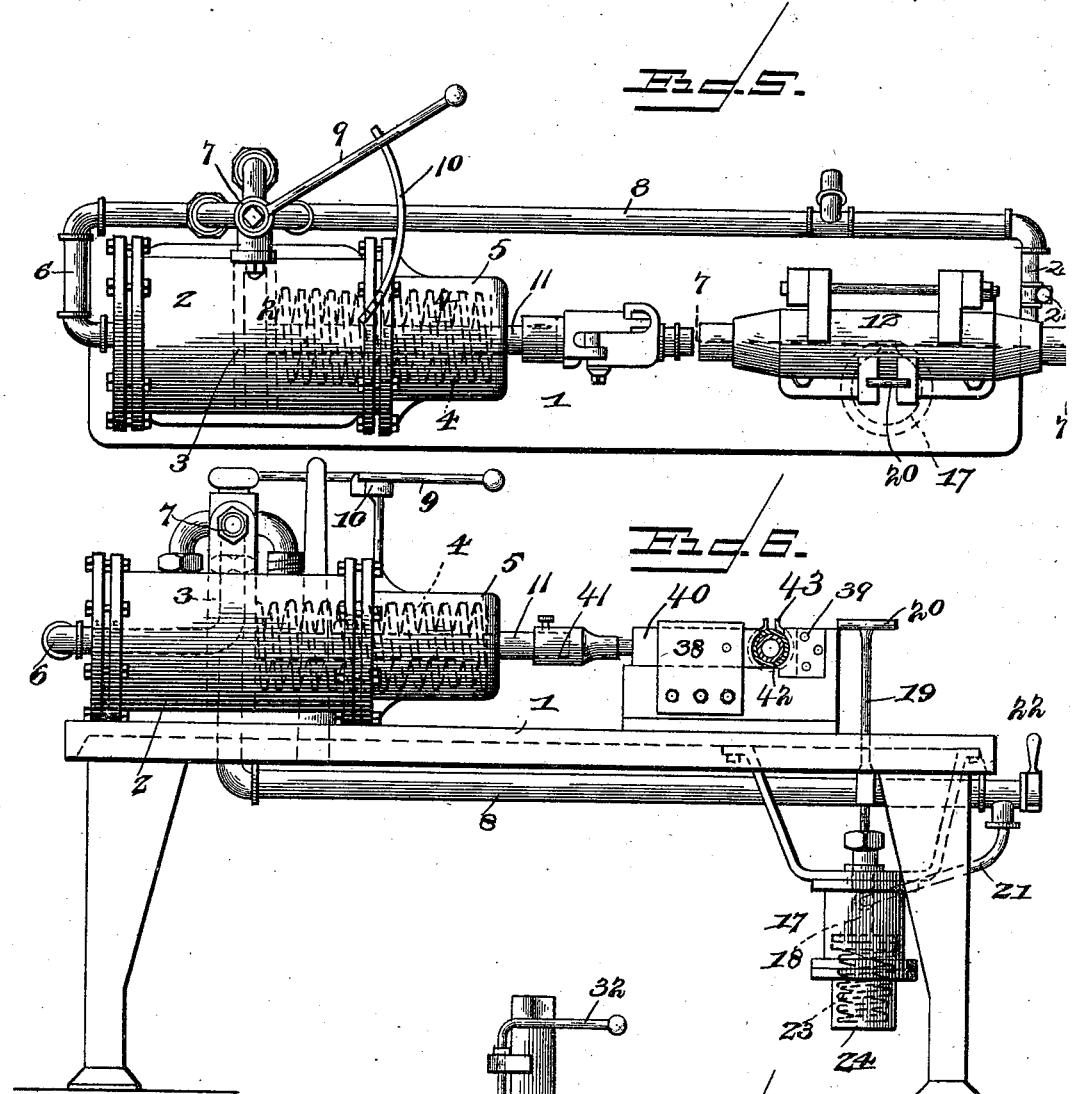

JOHN P. NOLAN AND JAMES D. CONNELL, OF NEW ORLEANS, LOUISIANA.

HOSE CUTTING AND MOUNTING MACHINE.

SPECIFICATION forming part of Letters Patent No. 517,057, dated March 27, 1894.

Application filed February 4, 1893. Serial No. 461,062. (No model.)

*To all whom it may concern:*

Be it known that we, JOHN P. NOLAN and JAMES D. CONNELL, residing at New Orleans, in the parish of Orleans and State of Louisiana, have invented an Improvement in Hose Cutting and Mounting Machines, of which the following is a specification.

Our invention relates to a method of and means for mounting hose couplings such as are employed in air-brakes, steam fittings, fire-engine hose, &c.; and it has for its object to provide means whereby the hose-sections may be cut to the proper length and held during the insertion of the stem of the coupling and the securing of the clamp, and to provide for accomplishing the same mechanically to insure a snug fitting of the coupling in the hose and avoid the straining of the latter.

Further objects and advantages of this invention will appear in the following description, and the novel features thereof will be particularly pointed out in the appended claims.

In the drawings in which we have shown a preferred form of the mechanism employed for carrying out our invention: Figure 1 is a side view of the machine with the parts arranged for cutting the hose to the proper length. Fig. 2 is a plan view of the guide, gage, and cutter. Fig. 3 is a side view of said guide, gage, and cutter. Fig. 4 is a side view of the machine with the parts arranged for the insertion of the coupling. Fig. 5 is a plan view of the same. Fig. 6 is a side view of the machine with the parts arranged for the application of the clamp. Fig. 7 is a longitudinal section of the holder and core.

Similar numerals of reference indicate corresponding parts in all the figures of the drawings.

To properly apply the coupling to a section of hose it is necessary, in the first place, to cut the end of the section squarely, and co-incidently with this trimming of the hose it is desirable to cut the latter into sections of the desired length. After the trimming of the end of the section, the latter must be held firmly while the stem of the coupling is forced longitudinally into the bore thereof.

In the machine which is illustrated in the drawings, 1 designates a supporting table, upon which at one end is arranged a horizontal cylinder 2, provided with a plunger 3, which is shown in dotted lines in Figs. 1, 4, and 6, an expansion spring 4 being arranged in a receptacle 5, at the front end of the cylinder and bearing against the front side of the plunger to repress the latter after each operation. Said expansion spring is shown in dotted lines in Fig. 1. Connected to the rear end of the cylinder is a branch pipe 6, which is connected, through the three-way cock 7, to the supply-pipe 8, said cock being provided with an operating-handle 9, which travels over a guide 10. The plunger-rod 11 projects beyond the front end of the cylinder.

Fixed to the above described table, at the opposite end thereof, is a holder 12, formed in two sections, the lower section 13 being secured firmly to the table, and the upper section 14 being hinged to the lower section and provided at its free side with parallel horizontal lugs 15, arranged parallel with similar lugs 16, upon the stationary or lower section. 17 represents a vertically-disposed cylinder, which is preferably arranged below the table and incloses a plunger 18, having a rod or stem 19, fitted at its extremity with a cross-head 20, which is adapted to engage the lugs 15 of the hinged section of the holder. Connected to the cylinder 17 near its upper end is a branch pipe 21, communicating with the supply-pipe 8, and controlled by a valve 22, an expansion spring 23, which is shown in dotted lines in Fig. 4, being arranged in the receptacle 24, at the lower end of the cylinder and bearing against the lower side of the plunger to elevate the latter after having been repressed by the pressure of the fluid introduced through the pipe 21.

The above constitutes means for holding the hose and inserting the coupling by steam, compressed air, or other fluid pressure; and in connection with the above mechanism we employ a cutting device, shown in Figs. 1, 2, and 3, which is adapted to be arranged upon the table and operated by means of the rod 11 and coacting parts. This cutting device comprises a fixed knife 25, and a coacting slidable knife 26, which is connected by means of a stem 27, to a socket 28, adapted to fit upon the projecting end of the plunger-rod 11, a tubular holder 29, arranged at right angles to the plane of the cutters, and a gage-bar 30 having right-angularly-disposed arms 31 and 32, at its extremities the latter of which is adapted to be turned, by grasping the end 31, to lie across the bore of the holder at its outer end as clearly shown in the drawings. With the cutting device arranged as shown in Fig. 1, the hose is inserted into the same from its inner end until the extremity of the hose comes in contact with the arm 32 of the gage-bar, disposed across the outer end of the holder 29 when the pressure is applied by turning the operating lever 9, and the plunger is caused to advance and thus operate the slidable cutter 26. It will be understood that this cutting device is supplementary to the means for inserting the coupling into the end of the hose.

To apply a coupling to a section of hose the latter is placed, as shown at 33, within the holder 12, a core 34 being arranged in the bore of the hose to prevent compression of the latter, the cross-head 20 of the stem or rod 19 is engaged with the lugs 15, and the steam or other fluid agent is turned into the cylinder 17, by means of the valve 22, thus depressing the plunger 18 and locking the movable section of the holder firmly in position. The core 34 terminates short of the extremity of the hose in order to provide sufficient space for the insertion of the stem of the coupling.

The above described arrangement of parts is shown clearly in Figs. 4 and 5, and in addition thereto a coupling 35, which in this case is shown as an ordinary Westinghouse air-brake coupling, is secured, by means of a clutch-head 36, to the projecting end of the plunger-rod 11, such plunger-rod and the stem 37 of the coupling being axially aligned with the bore of the hose. Pressure being now admitted to the cylinder 2, the plunger-rod carrying the coupling is caused to advance and force the stem of the coupling into the bore of the hose, the latter being held in position by the holder and inclosed core.

Subsequent to the insertion of the coupling into the hose it is required to apply a locking device or clamp to prevent the stretching of the hose and the consequent loosening of the coupling, and therefore we have provided, in connection with the above mechanism, a clamp applying device, which is shown in Fig. 6 in the operative position, and consists essentially of a guide or framework 38, a fixed jaw 39, and a slidable co-acting jaw 40, which is provided with a socket 41 to engage the end of the plunger-rod 11. The end of the section of hose with the neck or stem of the coupling shown in section, and a clamp 42 encircling said hose, is indicated in Fig. 6, as seen during the application of the clamp. After the movable jaw has been advanced and the clamp firmly compressed upon the exterior of the hose, the rivet or securing screw is inserted through the usual perforations in the parallel ears 43 to lock the clamp in place.

From the above description it will be understood that the improved method of applying a coupling to the hose-section consists, essentially, in clamping the hose with an inclosed core in a holder which is axially aligned with a fluid-operated plunger, whereby the coupling which is carried by the plunger-rod is forced firmly and steadily to place without unduly stretching the hose and without breaking or otherwise injuring the structure thereof.

The operation of the various parts of the mechanism illustrated will be readily understood from the above description.

Having described our invention, what we claim is—

1. The method of applying a coupling to a hose-section, consisting in clamping the hose-section with an inclosed core in axial alignment with a mechanically-operated plunger carrying the coupling, whereby, as the plunger advances, the stem of the coupling is forced into that portion of the bore of the hose which is not filled by the core, substantially as specified.

2. The combination with a fluid-operated plunger, and means for repressing the plunger, of a divided tubular holder arranged in axial alignment with said plunger, a loose core adapted to be fitted into the bore of a section of hose, a clutch for securing the coupling to the plunger-rod, and means for locking the sections of the holder, substantially as specified.

3. The combination with a fluid-operated plunger, and means for repressing the same, of an axially-aligned holder having a fixed lower section and hinged upper section, and a locking device for said holder comprising a fluid-operated plunger provided with a stem or rod which is loosely connected to the hinged section of the holder, and means for retracting the plunger, substantially as specified.

4. A machine of the class described consisting of the following instrumentalities, to wit; a fluid-operated plunger, and means for repressing the same, of a holding device arranged in axial alignment with the plunger, and a cutting device having its movable cutter provided with a socket to receive the plunger-rod, a tubular holder arranged perpendicular to the plane of the cutters, and a gage to obstruct the outer end of said holder, substantially as specified.

5. A machine of the class described consisting of the following instrumentalities, to wit; a fluid-operated plunger and means for repressing the same, a cutting device adapted to have its movable cutter connected with said plunger, a holding device adapted to be arranged in axial alignment with the plunger, and a clamp applying device adapted to have its sliding jaw connected with said plunger, said instrumentalities being successively operated as described.

JOHN P. NOLAN.
J. D. CONNELL.

Witnesses:
R. L. PREIS,
J. E. KILDUFF.